July 17, 1962   J. H. DOTTER   3,044,487
CUSHIONED HYDRAULIC CHECK VALVE
Filed Aug. 2, 1960   2 Sheets-Sheet 1
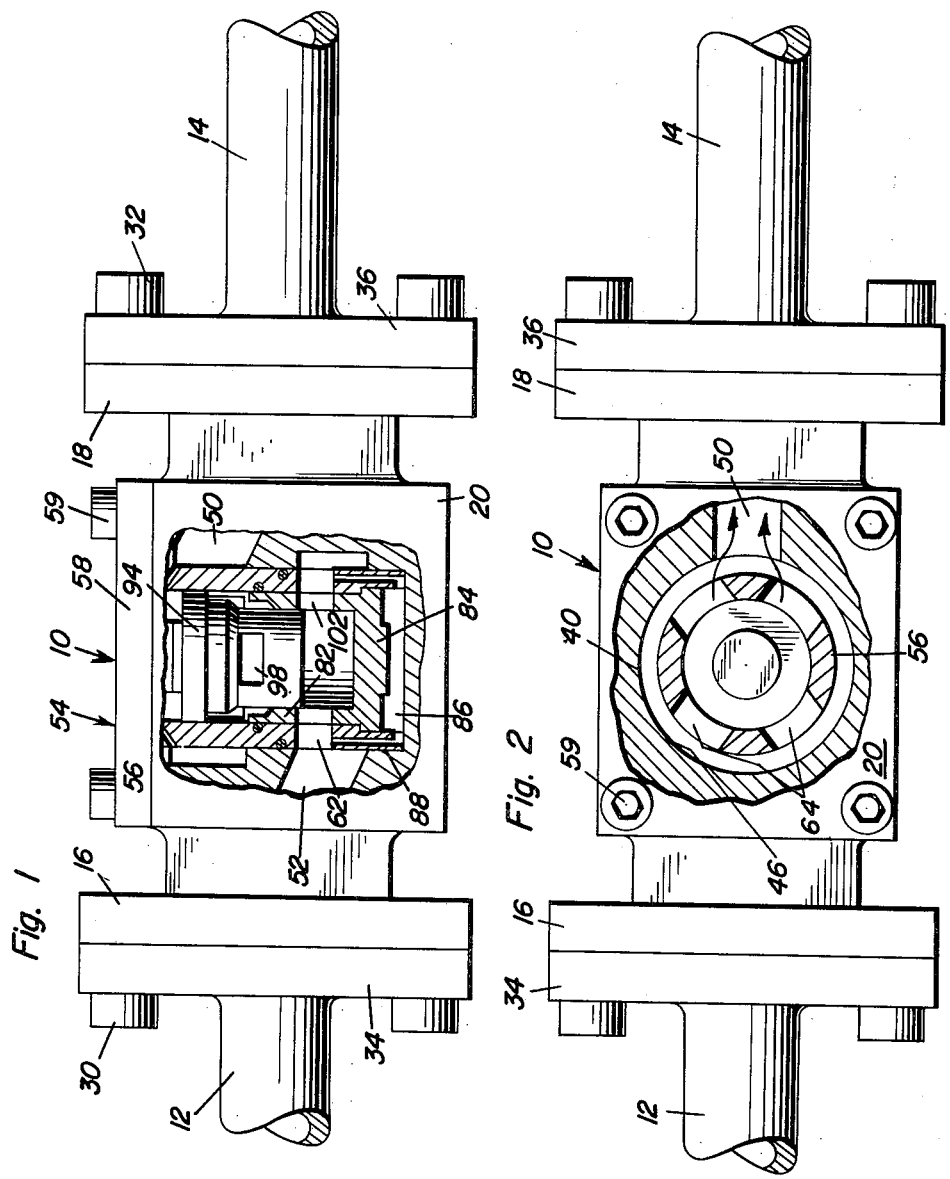
John Henry Dotter
INVENTOR.

July 17, 1962     J. H. DOTTER     3,044,487
CUSHIONED HYDRAULIC CHECK VALVE
Filed Aug. 2, 1960     2 Sheets-Sheet 2

John Henry Dotter
INVENTOR.

United States Patent Office 3,044,487
Patented July 17, 1962

3,044,487
CUSHIONED HYDRAULIC CHECK VALVE
John Henry Dotter, 3303 Shannon Drive, Baltimore, Md.
Filed Aug. 2, 1960, Ser. No. 47,018
8 Claims. (Cl. 137—514)

This invention comprises a cushioned hydraulic check valve and more particularly relates to a hydraulic check valve assembly wherein the pressure fluid whose flow is controlled by the check valve is utilized to obtain a cushioned movement of the check valve seat member of the assembly.

The primary object of this invention is to provide a cushioned check valve assembly in which the valve seat member is slidably mounted and has its movement cushioned by the fluid controlled by the valve assembly.

A further object of the invention is to provide a check valve assembly in accordance with the foregoing object wherein the entire check valve assembly shall be carried in a valve cage in a compact manner.

A still further object of the invention is to provide a hydraulic check valve assembly wherein the entire check valve assembly is compactly housed in a valve cage member and wherein the latter is in turn removably mounted in a valve body to thereby permit removal of the check valve assembly with the valve cage from the body as a unit and a similar insertion of the same thereinto.

Still another object of the invention is to provide a hydraulic check valve assembly in accordance with the foregoing objects which shall be capable of ready incorporation into various conduit systems for a check valve and its function if desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a check valve assembly in accordance with the principles of this invention, the same being shown in one manner in which it may be incorporated into a fluid conduit, with parts of the valve body being broken away to show the disposition of certain parts of the invention therein;

FIGURE 2 is a view similar to FIGURE 1 but taken at right angles thereto and showing in particular some of the passage means for flow of the fluid through the check valve assembly.

Figure 3:
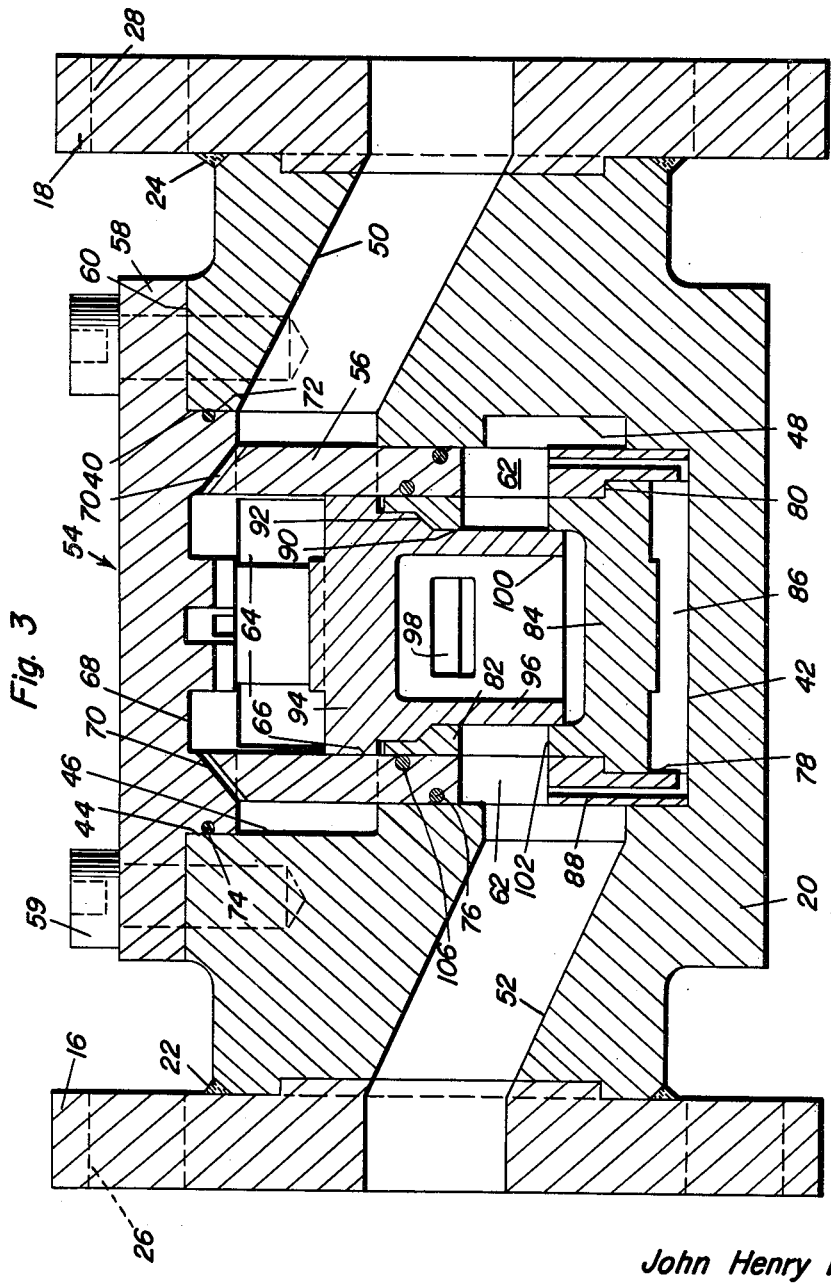
FIGURE 3 is a detail view upon an enlarged scale in vertical transverse section through the check valve assembly of FIGURE 1.

Referring first to FIGURE 1 it will be seen that the check valve assembly in accordance with this invention is indicated generally by the numeral 10 and is shown as being disposed between two portions 12 and 14 of a fluid conduit where it is desired to obtain the function of a check valve and prevent reverse flow through the conduit. As constructed and illustrated in the drawings the check valve assembly 10 is so arranged that flow will be permitted from the inlet conduit 12 to a discharge conduit portion 14 while reverse flow through the device will be prevented.

The check valve assembly 10 as a unitary assembly can be readily and removably connected between the two conduit portions 12 and 14 by means of cooperating mounting flanges as at 16 and 18 which are preferably welded to the opposite ends of the valve body 20, as shown in FIGURE 3, by means of welding 22 and 24. These mounting flanges are provided with suitably drilled bores 26 and 28 therethrough whereby through the agency of the conventional fastening bolts as at 30 and 32 which extend through corresponding bores in the mounting flanges 34 and 36 of the conduit portions 12 and 14, a ready attachment of or removal of the valve assembly 10 may be effected.

Referring now especially to FIGURE 3 it will be observed that the valve body 20 is provided with a generally cylindrical compartment, bore or chamber 40 having a closed bottom wall 42 adjacent one side of the valve body and having an opening 44 through an opposite side thereof. The chamber 40 is provided with diametrically enlarged bores as at 46 at its upper portion and 48 adjacent its lower portion, these enlarged bores communicating with fluid outlet and fluid inlet passages 50 and 52, respectively, which extend through the mounting flanges 18 and 16.

Removably received in the opening 40 is a valve cage indicated generally by the numeral 54. The valve cage includes a hollow body 56 which comprises a preferably cylindrical sleeve-like element having a laterally enlarged mounting flange 58 at its upper end adapted to rest upon complementary seating surfaces 60 on that side of the body 20 through which the opening 44 extends, this flange being detachably secured to the valve body as by fasteners 59 with the valve cage hollow body 56 being snugly received in the bore 40 as shown in FIGURE 3. It will be observed that the hollow body 56 comprises a cylindrical sleeve or skirt depending from the mounting flange 58, and has its lower end secured against or in closely spaced relation to the bottom wall 42 in the compartment 40. The sleeve further has a plurality of ports 62 extending through its side and registering with the enlarged bore 48 of the inlet passage 52 whereby the fluid under pressure to be controlled by the check valve is continuously placed in communication with the interior of the valve cage through the ports 62.

A second set of ports 64 extends through the upper portion of the valve sleeve and establishes continuous communication with the outlet passage 50, the ports 64 thus comprising fluid outlet ports which are continuously in communication with the fluid outlet passage 50.

It will be further observed that the upper portion of the hollow cylindrical chamber within the hollow body forming the valve cage sleeve 56, this chamber being indicated by the numeral 66, is provided with an annular recess or channel 68 on the bottom surface of the flange 58 which also is placed in continuous communication with the enlarged bore 46 as by the series of downwardly inclined passages indicated at 70.

It will be observed that effective fluid seals are established in fluid-tight sealing engagement provided between an enlarged annular shoulder 72 on the mounting flange 58 of the valve cage and the corresponding enlarged portion 46 of the compartment adjacent the opening 44 as by means of conventional O-rings 74 while a similar seal is established by O-rings 76 with an intermediate portion of the chamber or bore 40 between the two enlargements 46 and 48.

Adjacent its lower end, the internal cylindrical surface of the sleeve 56 of the valve cage 54 is provided with a diametrical enlargement as at 78 which thus provides an annular shoulder 80. Slidably received in the chamber or bore 66 of the valve cage is another hollow body in the form of a sleeve or seat member 82 which is slidably received in the bore 66 and which has a closed bottom wall defining a diametrically enlarged head 84 which is slidable within the enlarged bore 78. This enlarged head 84 is adapted to abut the shoulder 80 thereby limiting relative upward sliding movement of the valve seat member 82 within the valve cage.

It will thus be observed that the space below the closed lower head portion 84 of the valve seat member and the bottom wall 42 in the bore 40 comprises a chamber 86. This chamber has continuous communication as by the passages 88 which communicate with the inlet port 62 of the valve cage and constitute a means for supplying fluid below the valve seat member 82 whereby the pressure of the fluid of the inlet passage 52 is continuously applied to the underside of the valve seat member to thereby yieldingly urge the latter into its upward position.

When as set forth hereinafter a pressure is imposed upon the top side of the sleeve seat, the fluid below the member 84 contained in the chamber 86 constitutes a cushioning force applied to the underside of the valve.

As will be observed, the valve seat member 82 is open at its upper side and has a chamber or bore 90 therein which opens into the chamber or bore 66 of the valve cage. In the upper portion of the bore 90 is a tapered valve seat 92 of conventional character for a purpose to be subsequently apparent.

Slidably received in the open upper end of the bore 90 is a valve member including a diametrically enlarged valve head 94 which is slidable in the bore 66 and a diametrically reduced skirt or sleeve 96 which is slidably received in the bore 90. This sleeve is open at its lower end and is provided with suitable ports 98 through its sides which are so disposed that when the valve is in its raised position as shown in FIGURE 1, these ports will establish communication between the hollow interior or chamber 100 within the sleeve 96 of the valve member, and the inlet passage system 52, 62, the corresponding inlet ports 102 of the valve seat member, and the hollow interior or bore 100 of the valve member into the chamber 66 in the valve cage above the valve member and from thence to the discharge ports 64 previously mentioned, by way of the annular channel 68 and the ports 70 into the diametrical enlargement 46 and then through the fluid discharge passage 50.

However, it will be observed that when the check valve 94 lifts, fluid pressure from the inlet passage 52 will be exposed to the underside of the valve seat through the passages 88, and to the top side of the same by way of the inlet ports 102 into the bore 90 and thus be applied to the top surface of the bottom wall 84 of the valve seat member.

When the flow of fluid tends to reverse, the increase in pressure on the top side of the valve member will cause the same to close upon the seat 92 and the pressure of the now rigidly engaged valve 94 and the valve seat member 82 will force the latter downwardly against the cushioning action within the chamber 86.

Thus, there is always applied a cushioning action below the valve seat which tends to minimize noise, reduce wear and obtain a smoother closing action of the valve member.

Indicated by the numeral 106 is a further O-ring of conventional design which is applied between the bore 66 of the valve cage sleeve 56 and the exterior surface of the valve seat member 82 to further establish a fluid-tight seal therebetween.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cushioned hydraulic check valve assembly comprising a valve casing with an opening therein and a valve cage removably seated in said opening, said valve cage having a chamber therein and having spaced fluid inlet and outlet ports extending through the wall of said cage and communicating with said chamber, a valve seat member having a closed bottom wall forming a piston slidably received in said chamber and having a bore therein with a valve seat communicating said bore with said chamber, means in said valve seat member communicating said inlet port with said bore, a valve member in said cage cooperating with said valve seat and controlling flow from said inlet to said outlet port, a supply means in said cage establishing communication between said inlet port and said chamber below said seat member for applying fluid pressure to yieldingly urge the latter for sliding movement in said chamber and abutment means on said seat member and cage for limiting movement of said seat member.

2. A cushioned check valve assembly comprising a valve body having a compartment therein, spaced fluid inlet and outlet passages in said body communicating with said compartment, a valve cage removably seated in said compartment and having a chamber therein and having spaced fluid inlet and outlet ports extending through the wall of said cage and communicating with said chamber, a valve seat member having a closed bottom wall forming a piston slidably received in said chamber and having a bore therein with a valve seat communicating said bore with said chamber, means in said valve seat member communicating said inlet port with said bore, a valve member in said cage cooperating with said valve seat and controlling flow from said inlet to said outlet port, a supply means in said cage establishing communication between said inlet port and said chamber below said bottom wall of said seat member for applying fluid pressure to yieldingly urge the latter for sliding movement in said chamber and abutment means on said seat member and cage for limiting movement of said seat member, said valve cage inlet and outlet ports respectively having continuous communication with said fluid inlet and outlet passages respectively.

3. The combination of claim 1 wherein said supply means comprises passages in the wall of said valve cage establishing continuous communication between said inlet port and the interior of said chamber below said seat member.

4. The combination of claim 2 wherein said supply means comprises passages in the wall of said valve cage establishing continuous communication between said inlet port and the interior of said chamber below said seat member.

5. The combination of claim 2 wherein said compartment has an opening through one side of said valve body, said valve cage being removably disposed in said compartment through said opening, a flange on said valve cage removably secured to said valve body and forming with said valve cage a closure for said opening.

6. A cushioned hydraulic check valve assembly comprising a valve cage having a chamber therein and having spaced fluid inlet and outlet ports communicating with said chamber, a valve seat member slidably received in said chamber and having a bore therein with a valve seat communicating said bore with said chamber, means in said valve seat member communicating said inlet port with said bore, a valve member in said cage cooperating with said valve seat and controlling flow from said inlet to said outlet port, a supply means establishing communication between said inlet port and said chamber below said seat member for applying fluid pressure to yieldingly urge the latter for sliding movement in said chamber, and abutment means on said seat member and cage for limiting movement of said seat member, said cage comprising a hollow body closed at one end, said valve seat member comprising a second hollow body closed at its bottom end with an open top carrying said valve seat and disposed adjacent the closed end of said valve cage, said valve member comprising a third hollow body having a valve head closing one end thereof and engaging said valve seat and having a depending skirt open at its lower end and slidable in said second hollow body.

7. A cushioned check valve assembly comprising a valve body having a compartment therein, spaced fluid inlet and outlet passages in said body communicating with said compartment, a valve cage having a chamber therein and having spaced fluid inlet and outlet ports communicating with said chamber, a valve seat member slidably received in said chamber and having a bore therein with a valve seat communicating said bore with said chamber, means in said valve seat member communicating said inlet port with said bore, a valve member in said cage cooperating with said valve seat and controlling flow from said inlet to said outlet port, a supply means establishing communication between said inlet port and said chamber below said seat member for applying fluid pressure to yieldingly urge the latter for sliding movement in said chamber, said valve cage inlet and outlet ports respectively having continuous communication with said fluid inlet and outlet passages respectively and abutment means on said seat member and cage for limiting movement of said seat member, said cage comprising a hollow body closed at one end, said valve seat member comprising a second hollow body closed at its bottom end with an open top carrying said valve seat and disposed adjacent the closed end of said valve cage, said valve member comprising a third hollow body having a valve head closing one end thereof and engaging said valve seat and having a depending skirt open at its lower end and slidable in said second hollow body.

8. The combination of claim 2 wherein said body has a pair of mounting flanges disposed on separate sides thereof, said fluid inlet and outlet passages each extending through one of said mounting flanges.

References Cited in the file of this patent

UNITED STATES PATENTS

| | | |
|---|---|---|
| 1,152,604 | Coll | Sept. 7, 1915 |
| 1,539,617 | Williston | May 26, 1925 |
| 2,289,556 | Stoyke | July 14, 1942 |
| 2,332,406 | Smith | Oct. 19, 1943 |
| 2,667,893 | Kupiec | Feb. 2, 1954 |